United States Patent [19]
Randall

[11] Patent Number: 5,237,651
[45] Date of Patent: Aug. 17, 1993

[54] ELECTRONIC PERSONAL ORGANIZER

[75] Inventor: Stephen Randall, London, United Kingdom

[73] Assignee: Eden Group Limited, United Kingdom

[21] Appl. No.: 814,241

[22] Filed: Dec. 20, 1991

Related U.S. Application Data

[63] Continuation of Ser. No. 465,127, filed as PCT/GB88/00666, Aug. 11, 1988, abandoned.

[30] Foreign Application Priority Data

Aug. 21, 1987 [GB] United Kingdom ............... 8719829

[51] Int. Cl.$^5$ ............................................. G06F 15/62
[52] U.S. Cl. .................................. 395/148; 340/706; 395/155; 395/157
[58] Field of Search ............... 340/706; 364/705.06, 364/705.07, 705.08, 709.01, 709.11, 710.04; 395/155-157, 159-161, 148

[56] References Cited

U.S. PATENT DOCUMENTS

| | | | |
|---|---|---|---|
| 4,279,022 | 7/1981 | Abe | 364/900 |
| 4,649,499 | 3/1987 | Sutton | 364/518 |
| 4,715,010 | 12/1987 | Inoue et al. | 364/900 |
| 4,763,356 | 8/1988 | Day, Jr. et al. | 364/900 |
| 4,873,623 | 10/1989 | Lane et al. | 364/200 |
| 4,912,640 | 3/1990 | Tsugei | 364/705.06 |
| 5,008,854 | 4/1991 | Maeda et al. | 364/705.06 X |
| 5,049,862 | 9/1991 | Dao et al. | 340/706 |

FOREIGN PATENT DOCUMENTS

| | | |
|---|---|---|
| 2537400A1 | 2/1977 | Fed. Rep. of Germany . |
| 58-14247 | 1/1983 | Japan . |
| 58-86674 | 5/1983 | Japan . |

OTHER PUBLICATIONS

Richard H. Stern, "Legal Protection of Screen Displays and Other User Interfaces for Computers: A Problem in Balancing Incentives for Creation Against Need for Free Access to the Utilitarian," *Columbia-VLA Journal of Law & The Arts*, vol. 14, pp. 283-378 at 298-299, also footnote 36, 1990.

*Lotus Development Corp. v. Paperback Software Intern*, 740 F. Supp. 37, 56 (D. Mass. 1990).

Hicks & Essinger, *Making Computers More Human: Designing for Human Computer Interaction*, pp. 66-70, 74-77, 79-83.

Teresa L. Roberts, "Perspectives of a Modern User-Interface Designer," *Human-Computer Interaction*, Elsevier Science Publishers B.V., Amsterdam, 1984, pp. 61-66.

David Tebbutt, "The Shape of Things to Come," *MacUser*, pp. 67-70.

*Background Information GO Corp.'s PenPoint TM Operating System for Mobil, Pen-Based Computers*, GO Corporation, pp. ii, 1-17.

Richard Landry, "PenPoint Puts It in Writing," *PC World*, Mar. 1991, pp. 83-86.

"Evolution of Pen Computing (1991-1995)," *GO-Market Vision*, Sep. 11, 1991.

"Sony Palmtop," *Personal Computer World*, Nov. 1990, pp. 144, 146-147.

*Primary Examiner*—Heather R. Herndon
*Attorney, Agent, or Firm*—Knobbe, Martens, Olson & Bear

[57] ABSTRACT

An electronic personal organizer that electronically displays graphics representative of pages of a loose-leaf booklet or binder arranged into various sections on a display screen, including user selectable operational modes allowing input and storage of user generated graphics, notes, addresses, messages, etc. onto the representative pages. User input to the organizer is accomplished through a stylus ad an input tablet or transducer pad sensitive to pressure or position of the stylus, the organizer including a microprocessor for controlling the organizer, permanent and temporary internal memory along with external interfaces for connection with additional storage devices, printers, or other dumb or smart peripheral devices.

26 Claims, 13 Drawing Sheets

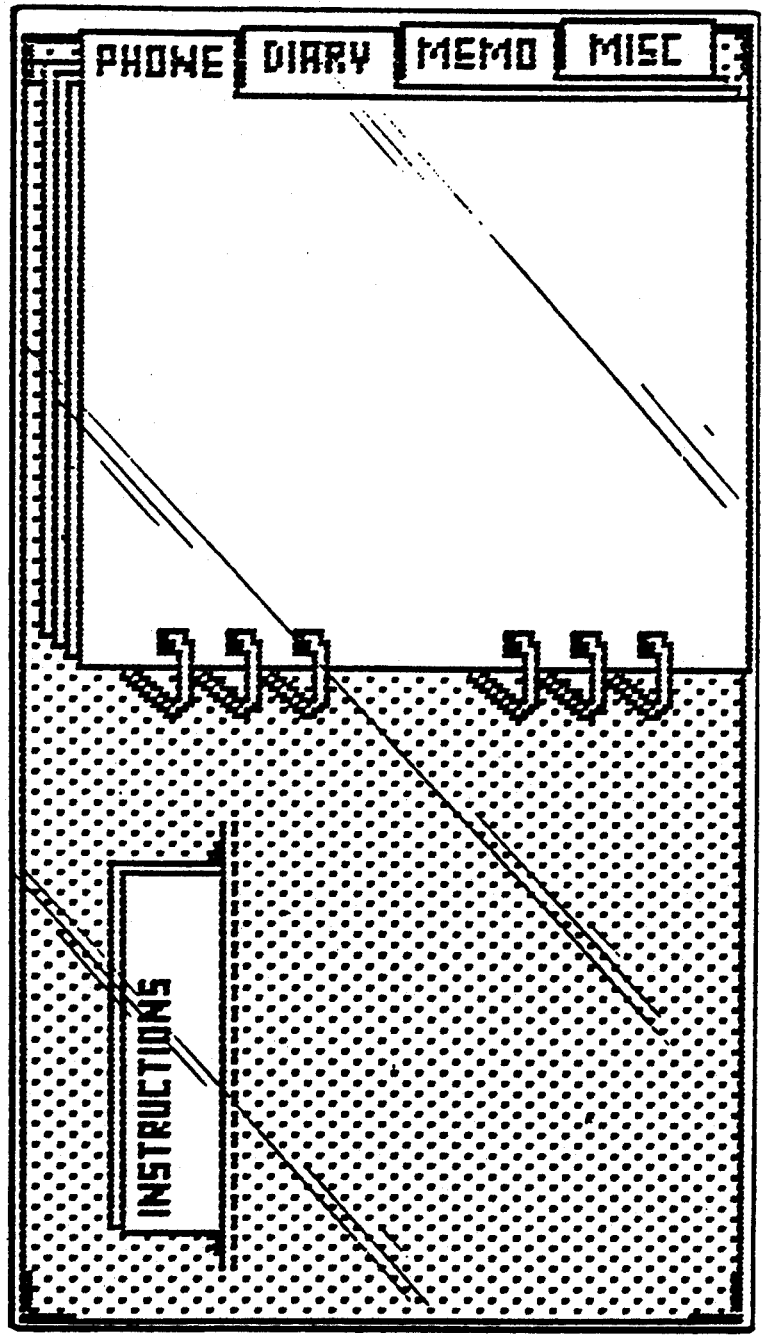

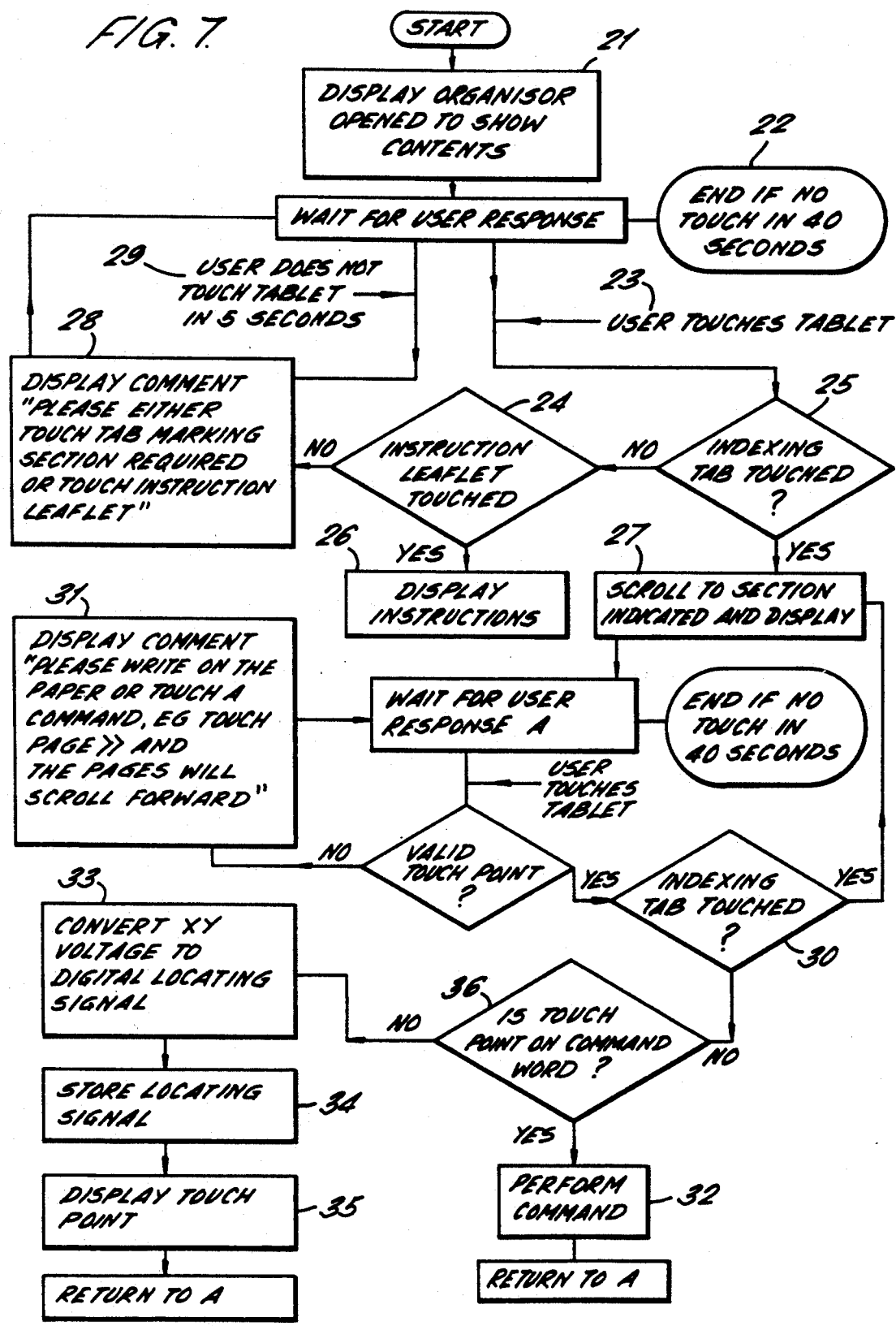

ELECTRONIC PERSONAL ORGANIZER

This application is a continuation of application Ser. No. 465,127, filed as PCT/GB88/00666, Aug. 11, 1988, now abandoned.

BACKGROUND OF THE INVENTION

1. Field of the Invention

This invention relates to an electronic personal organisor and in particular to an electronic personal organisor which can provide the same functions as a conventional personal organisor.

The term conventional personal organisor used herein refers to a compact hand held loose leaf binder into which may be inserted a number of pages which are obtainable in a variety of printed formats. For instance, a set of pages forming a year diary may be obtained, as may be a set of pages forming an A-Z address section. In addition to these conventional features, other pages, for instance maps, events calendars, and personal expenditure cost sheets may be obtained. Consequently, the conventional personal organisor has become in recent years a popular and to some indispensable medium for recording information. The term electronic personal organisor refers to an electronic device which can provide the functions of a conventional personal organisor.

An essential ingredient for the usability of such conventional personal organisors is the familiarity of their appearance to a user. The familiarity is based not only on the arrangements of alphanumeric visual cues, but on additional visual cues presented to the user. When looking at a conventional personal organisor open at, for instance, a page of the address section, the alphanumeric visual cues comprise cues specifying what sort of data is to be written in, for instance the alphanumeric visual cue may be the letter "A" at the top of a page specifying that surnames beginning with the letter "A" should be entered on that page. Such cues may be essential to both render the data meaningful, in that they give the context of the data, and to facilitate data retrieval. For instance, an entry in the address section is only readily retrievable because of the organisation of sections each corresponding to a letter of the alphabet, and will only be appropriately entered in the first place because of the cues to the user to input the name in its appropriate section. It is, however, essential that there are not only these alphanumeric cues derived from the column of letters of the alphabet running along one edge but also further cues deriving from for example, the following features; the provision of each letter of the alphabet on a sequential arrangement of single tabs; the overlaying a sheath of pages being divided into sections with each section having as its first page a page with such a tab, these cues being indicative of the organisaiton of the pages; the ring binders indicative of the manner in which pages may be turned over; and also the features which trigger the recognition in the user that the user is faced with paper upon which, his experience informs him, he can write with a pen or pencil.

Without these cues the user may not only not be able to readily use the address section, he may actually not recognise it as an address section at all. When the user recognises that what is before him is a depiction of an address section comprised of a number of pages and readily appreciates the manner in which he may use it there can be said to be a sufficiency of visual cues.

The term "representational graphics" used herein refers to a depiction displayed by a device which to a user sufficiently represents the appearance of a number of printed pages such as are used in a conventional personal organisor and which are together organised in the same manner as pages in a conventional personal organisor so that the nature and mode of use of the device would be readily apparent to that user, i.e. depictions which provide a sufficiency of visual cues.

2. Description of Prior Art

Portable computers are known which provide a variety of desirable notebook features such as diary or address book functions. Generally, information input is achieved through an alphanumeric keyboard. Consequently, input of information is not only somewhat slow but is also limited solely to alphanumeric text.

It is also known to provide arrangements for converting the position of a manually operated writing or tracing member into an electrical signal. For instance, transducer pads are known which provide electrical signals representing the co-ordinates of a point at which pressure is applied locally, by a stylus, to a writing surface of the pad.

Generally, such a writing surface is a flexible electrically resistive membrane separated from an electrically conductive base so that the pressure applied by the stylus results in electrical contact between the membrane and the base. Each pair of opposing edges of the membrane may have a voltage applied so that when pressure is applied by the stylus the potential of the base at the contact point is indicative of a position co-ordinate of the stylus. Consequently, continuous monitoring of the position of the stylus during writing or drawing is possible, allowing the simultaneous reproduction of the writing or drawing at a remote location and the digitising and storing of the writing or drawing in a digital frame store. Commonly, such arrangements are used in computerised design and computer graphic systems having substantial memories and processing power.

In addition, it is know to lay a transducer pad over a display panel to provide a touch screen. EP-A-0271280 discloses a personal computer based system using such an arrangement, which displays typographical arrangements corresponding to forms. The computer generates a number of user prompts, for instance highlighting a field in the form to be filled in and providing a menu of alternatives for insertion in that field. It will be appreciated that what is displayed are not representational graphics within the meaning of the term as defined herein.

Further reference may be made to GB-A-2145547 which discloses an electronic memo device comprising a transducer pad, display panel and keyboard. The purpose of the keyboard is to allow the input of indexing data to be associated with handwritten data input using the transducer pad. No representational graphics are utilised in this device whatsoever. The operating procedures required to use the product are also neither immediately familiar nor even readily learnt; the user/device dialogue is both unnatural and complicated. This is a major disadvantage when compared to the familiarity and ease of the use of a conventional memo device, i.e. printed memo pad.

SUMMARY OF THE INVENTION

In accordance with the present invention, an electronic personal organiser comprises means for generating signals to provide predetermined representational graphics, display means for displaying the graphics, input means comprising a transducer pad and a member manually operable to be positioned in dependence on the representational graphics displayed to thereby co-operate with the pad, means for converting the position of the member into electrical signals indicative of the position of the member with respect to the pad, means for driving the display means comprising means for utilising said electrical signals in forming an image on the display, and means for storing the electrical signals in dependence on the representational graphics displayed.

Consequently, not only may the user input any graphic information he chooses to be reproduced by the display means but he may also achieve the input in a way that is both familiar and entirely natural since representational graphics are utilised. The graphics depict pages, including the information signifying the function of those pages, in a format familiar from conventional personal organisors as well as conventional diaries and address books, for example. Furthermore, the graphics provide further visual cues such as, for instance, derive from the depiction of the overlaying of adjacent pages and the depiction of ring binders. Consequently, what is actually seen by the user is an image which may, by the sufficiency of visual cues, be immediately recognised as a depiction of, and thus associated with, a conventional personal organisor.

Accordingly, the invention is predicated on the insight that an electronic personal organisor may be made which is as easy and familiar to use as a conventional personal organisor if representational graphics are used. An electronic personal organisor in accordance with the present invention will have numerous advantages over a conventional organisor, not only in terms of data storage capability but in terms of the further inventive features referred to below.

Conveniently, the means utilising said electrical signals may be arranged to allow selection of a required operational mode in dependence on the representational graphics displayed. For instance, the display may provide the appearance of an open conventional personal organisor open at the front page, beneath which page appear the edges of a sheath of pages, some having tabs on which appears an indexing word e.g. "DIARY", signifying a particular operational mode. Selection of the required mode is then effected by positioning the manually operable member so that it co-operates with the pad to produce the required electrical signal. The positioning of the member is in dependence upon the position of the relevant tab as displayed. The term operational mode used herein refers to the manner of operation. For instance, when in the "address" operational mode, the organisor is operating as an address book by displaying representational graphics depicting a conventional organisor open at its address section. The edges of a sheath pages is displayed beneath a front page having a tab indexed by the letter "A". further tabs are shown defining sections of the sheath and each marked by a letter of the alphabet.

Preferably, the transducer pad overlays the display means so that a given portion of an image on the display lies substantially below the position on the pad at which the member co-operates with the pad to result in the electrical signals utilised in forming the given portion. This greatly facilitates the ease and familiarity with which the apparatus may be used. Thus, where a page with a tab marked "diary" is displayed, the user need only touch the region of the pad overlaying the tab for the "diary" operational mode to be selected.

Similarly, when the address section is entered by pressing the "address" tab, and the user wants to look at the "B" section of addresses, the member may simply be touched upon the tab with a letter "B" for the first page of the "B" section of addresses to be displayed.

Preferably, the means for generating predetermined graphics is arranged to provide representaional graphics depicting a page or pages turning over, after the selection of a required operational mode or pages within a mode and before the display of representational graphics associated with the selected mode or page.

It will be appreciated that this greatly enhances the user-friendliness of the organisor by providing further familiar visual cues as to the working of the organisor.

In accordance with another aspect of the present invention, an electronic personal organisor for electronically displaying simulated pages representative of a loose-leaf booklet arranged into various sections comprises a display screen;

display means programmed to generate a display on the display screen representative of a menu displaying available sections of said booklet and representative of printed information associated with different pages of said available sections;

memory means;

input screen means including an input tablet for generating positional information when the latter is contacted by a stylus, whereby, when any one page available for display is displayed on the screen, handwritten information inputted via the input tablet is displayed on the display screen and is also stored in said memory means for subsequent recall in association with said any one page; and control means, associated with said display means and said memory means, operable to change the display on the display screen to switch the display between the menu and pages of any one selected section of the menu and, when a page of a section is on display, to sequence through the pages of that section as required, any one page displayed on the display screen at any one time depicting both the representative printed information associated with that page and any handwritten information associated with that page and stored in the memory means.

Preferably, the control means includes control regions of the input tablet which, when contacted by a stylus effect the said change of display, the control regions being arranged to be positioned over visual cues generated by the display means for display on the display screen.

It will be appreciated that the display is preferably a display of representational graphics as hereinbefore defined.

BRIEF DESCRIPTION OF THE DRAWINGS

An embodiment of the invention will now be described with reference to FIG. 1 of the drawings, which is a plan view of an electronic personal organisor in accordance with the present invention, FIG. 2 which is a schematic block diagram illustrating the major circuitry of the electronic personal organisor, FIGS. 3-6a which depict typical representational graphics which may be displayed by the display means of the device, and FIG. 7 which depicts a simplified flow chart illustrating the operation of the organisor.

DETAILED DESCRIPTION

Figure 1:
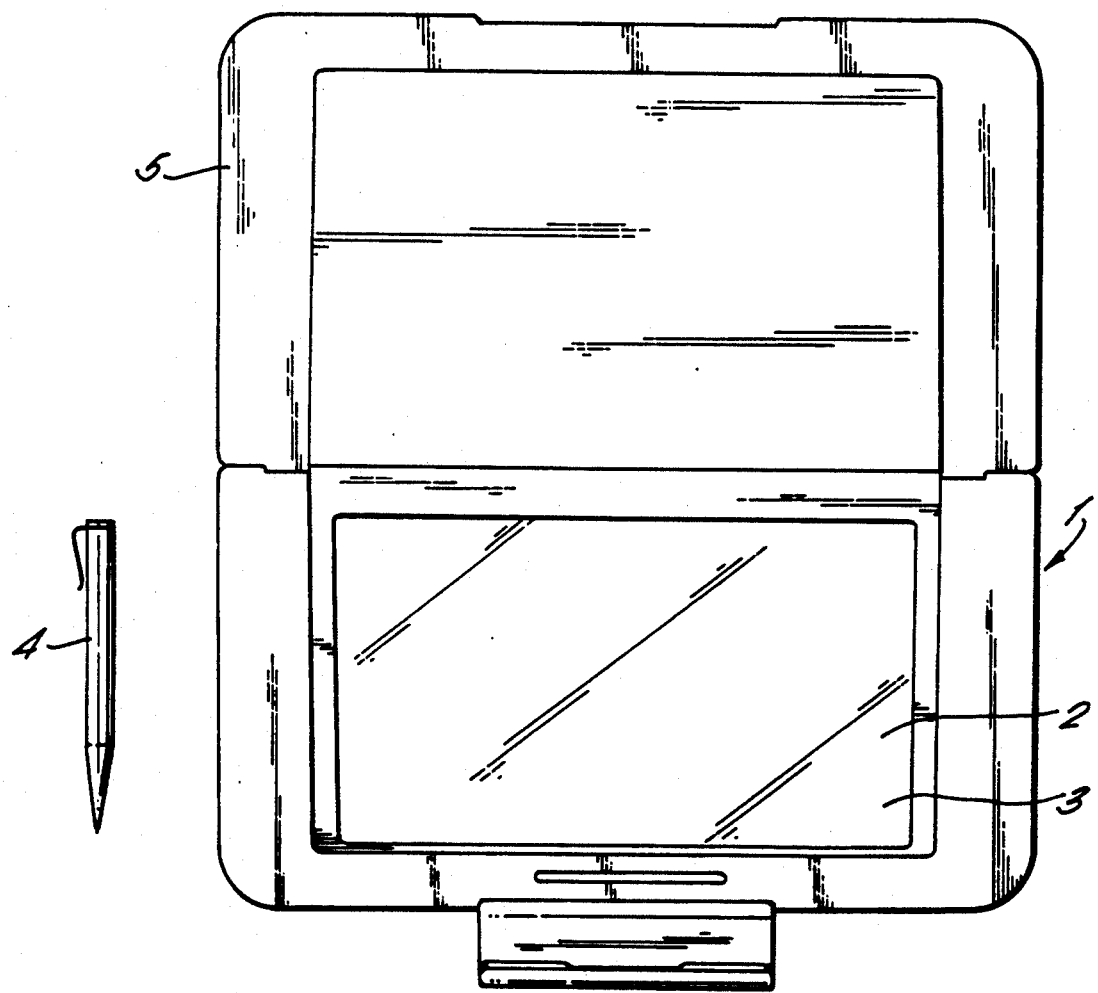

Referring now to FIG. 1, a display means, indicated generally at 1, preferably comprising an LCD type display 2, is shown hingedly attached to a lid indicated generally at 5. An input means comprises a translucent transducer pad 3, overlying the display 2. The pad 3 may be a membrane type sensor operable to provide an electrical signal indicative of the position on the pad 3 at which 1 pressure, in excess of a predetermined threshold press, is applied by a manually operated member, here shown as a pen type stylus. Further arrangements (not shown) of transducer pad 3 may prove convenient. For instance, the manually operated member 4 may be operable to provide a voltage signal to the pad 3, the pad 3 having sensors arranged to provide an electrical signal indicative of the position of the pad in dependence upon the voltage measured by said sensors.

It is preferable to have a pad with a slightly roughened surface so that the stylus does not slip and to more closely duplicate the feeling of pen writing on paper.

The display means 1 and lid 5 are arranged to close together to form a compact and portable unit which may be readily opended for use as an electronic personal organisor.

The stylus 4 may comprise first and second portions 6 and 7 respectively, with which contact may be alternatively made with the pad 3. Contact with the first portion 6 results in electrical signals which may be utilised in forming an image, whereas contact with the second portion 7 results in an image. A variety of arrangements may be provided to enable discrimination between contact by the first and the second portions 6, 7 of the stylus.

It will be appreciated that an internal power supply and a variety of electronic components are contained within the device. It will also be appreciated that the detailed electronic design would be a routine matter for one skilled in the art.

Figure 2:
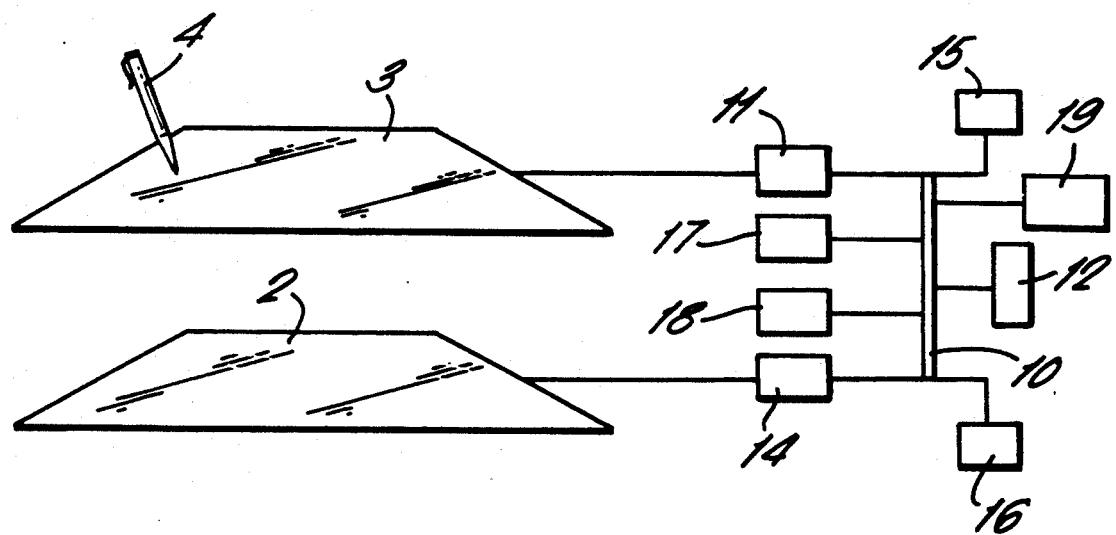

Referring now to FIG. 2, the transducer pad 3 is shown schematically overlaying the LCD type display. The transducer pad 3 is of a type known as an Indium Tin Oxide (ITO) pad and is operable to supply a signal indicative of the x-y co-ordinates at which the stylus 4 has touched the pad 3. The operation of the pad, for example the manner in which it converts the position of the stylus to electrical signals indicative of the x-y co-ordinates, is well known and will not be further described herein.

The electrical signals from the pad 3 are supplied to an A to D converter 11 feeding a data path or system bus 10. A CPU 12 is connected for bidirectional data flow to the bus 10, as is a RAM 17. A ROM 18 is also connected to bus 10, being programmed with the operating and application programmes for the organisor, which are executed by microprocessor or CPU 12. CPU 12 provides all control signals via bus 10. RAM 17 stores the user input in locations dependent upon the displayed graphics associated with the input. RAM 17 may be a non-volatile device such as an EEPROM or magnetic bubble memory, such as the 4 megabit 7114 manufactured by Intel Corp. CPU 12 may be a powerful microprocessor such as the Z80 manufactured by Zilog Microcomputers or the 8088 manufactured by Intel Corp. A rechargeable battery pack (not shown) provides the power required by the various components such as CPU 12 and ROM 18. In addition there is provided an EIA RS-232 serial interface 19 connected to bus 10 for the inputting and offloading of data. For instance, interface 19 provides a convenient means for communicating to a printer (not shown). Alternatively, the CPU 12 may include both ROM 17 and RAM 18, in which case the CPU 12 not only generates the signals to the display driver 14 which result in representational graphics being displayed, but also stores the digital signals from the A to D convertor 11 in predetermined locations according to the representational graphics displayed and with which the resulting image must of course be associated. A display driver 14 connected to bus 10 drives the LCD display 2 which is preferably a supertwist type display or a neutralised twisted nematic display.

A smart card reader 15 may be provided and provide input to the bus 10 so that information stored on a smart card may be accessed and displayed. The reader 15 may either be integral with the device and thus connected to bus 10 (as shown) or may be an optional component accessing bus 10 via the interface 19. This allows a number of additional modes to be catered for by the present invention. For example, a smart card containing a microprocessor programmed as a full function calculator may be provided, in which case a display of a keyboard of a full function calculator plus display would be shown. The user would operate the calculator by pressing the keys of the keyboard in the same way as if using a real calculator. For some applications, the card may comprise essentially only a memory chip preprogrammed with specific information. For instance, the card may contain maps or other specialised information. There may also be an additional memory store 16 into which the information stored in the RAM 17 may be downloaded. This additional memory store 16 is removable for secure keeping so that should the associated electronic personal organisor be lost then the memory store 16 may be used to transfer its contents into a further electronic personal organisor. It will be appreciated that this is a significant advance over that possible with a conventional personal organisor. Memory store 16 may be integral with the device and connected to bus 10 (as shown) or may be an optional component accessing the bus 10 via interface 19.

The use of the device will now be described with reference to FIGS. 3 to 6a and FIG. 7. On opening the lid 5, which automatically turns the device on, there is shown (step 21) on display 2 the depiction of FIG. 3. It will be appreciated that the representational graphics illustrated provide the appearance of a conventional personal organisor and that the user will at once be familiar with that presented to him.

Figure 3A:
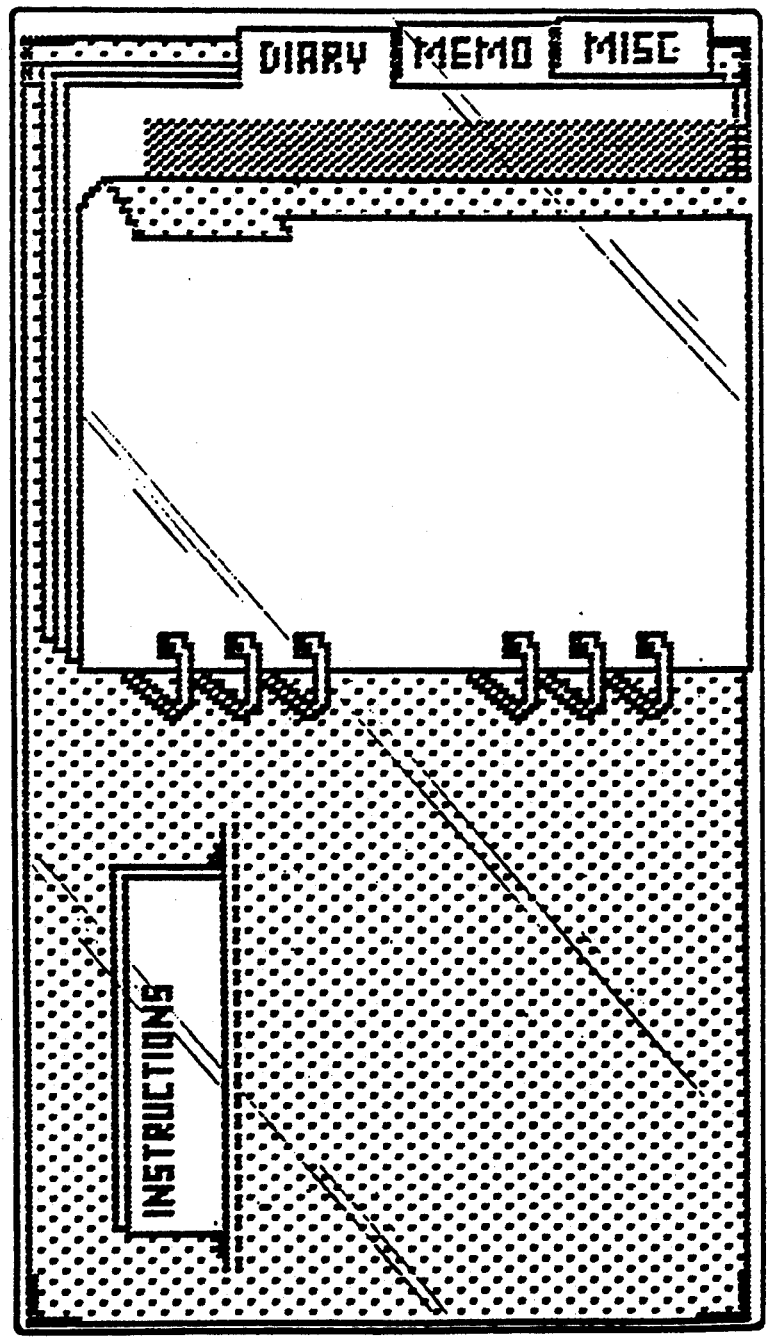
Figure 4:
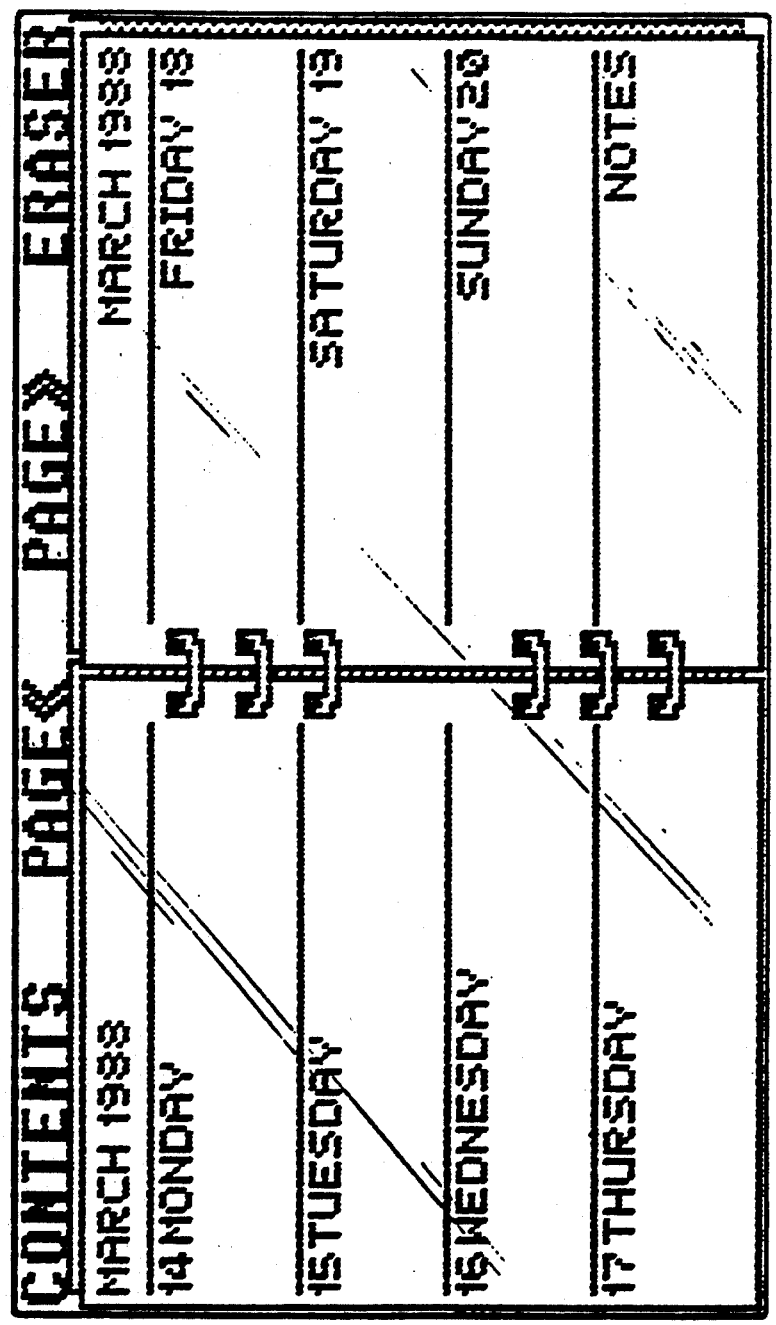
Figure 4A:
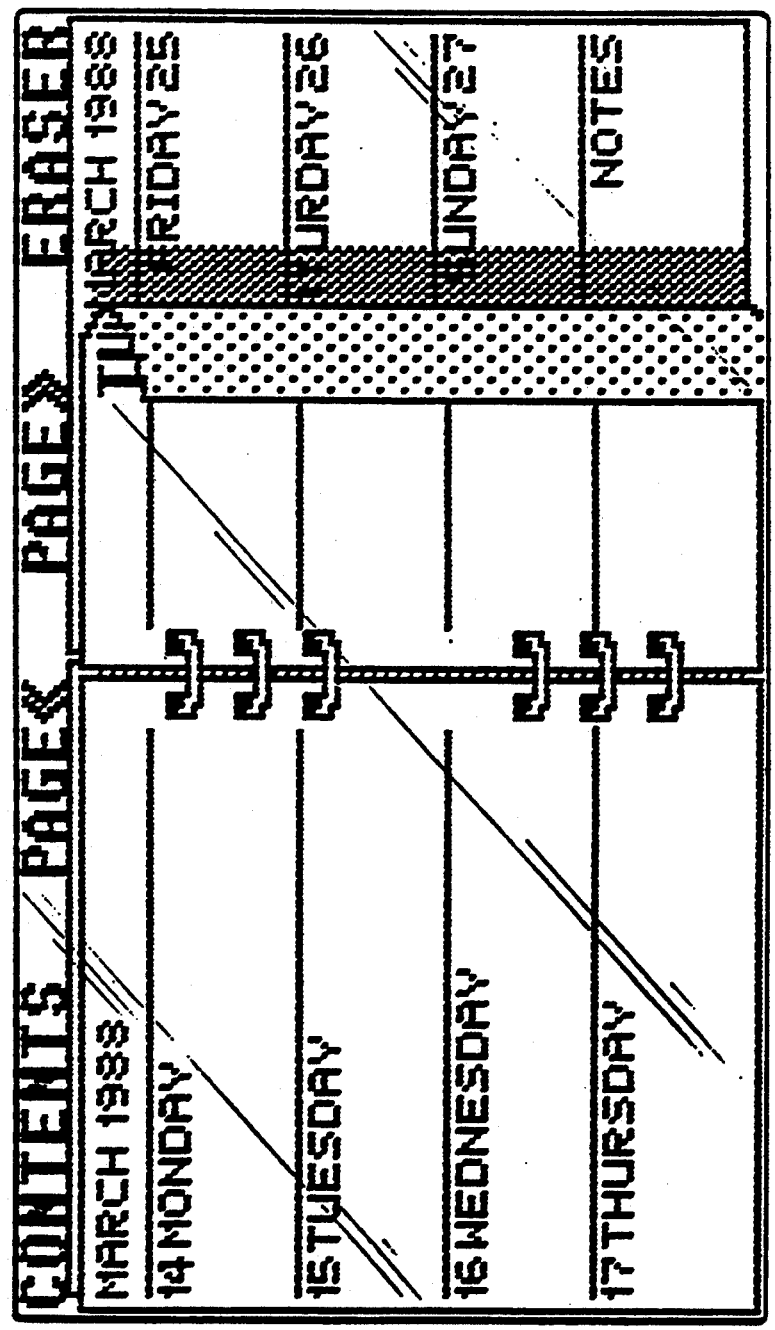
Figure 4B:
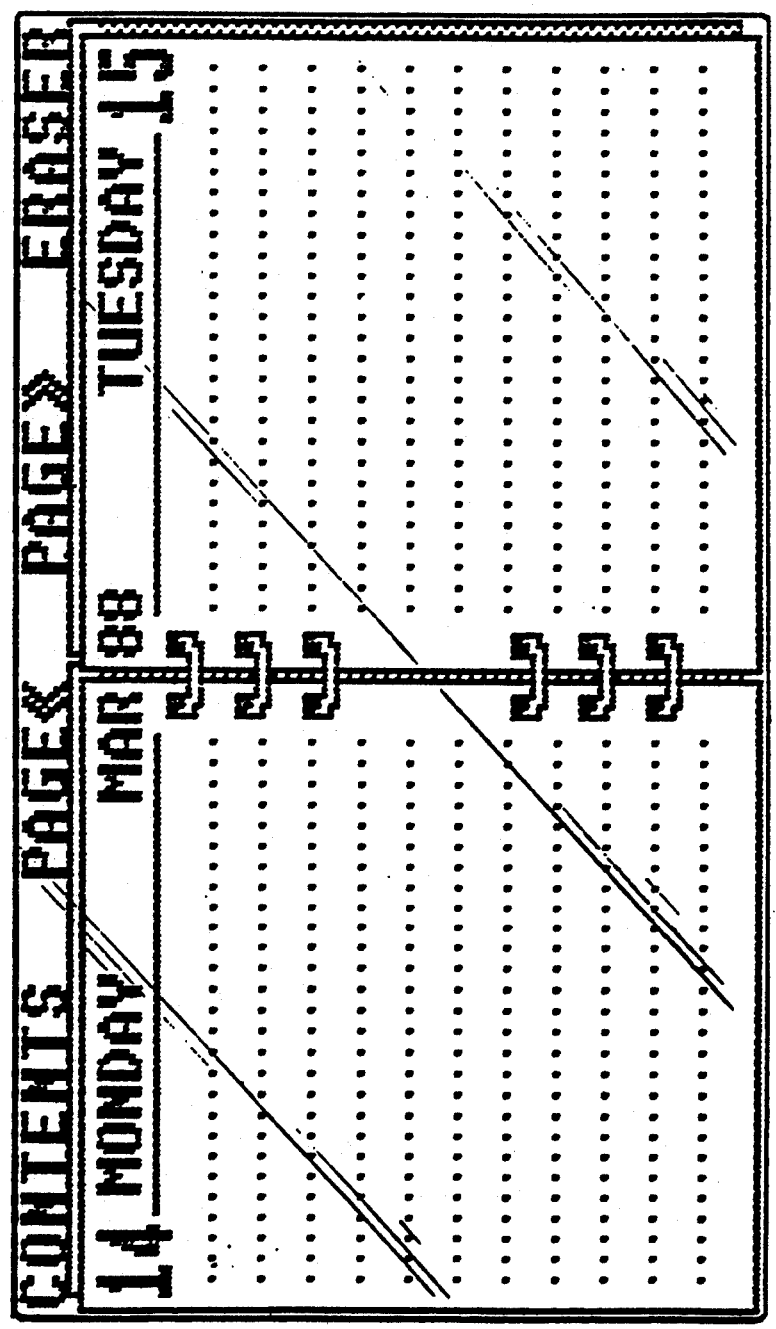
Figure 4C:
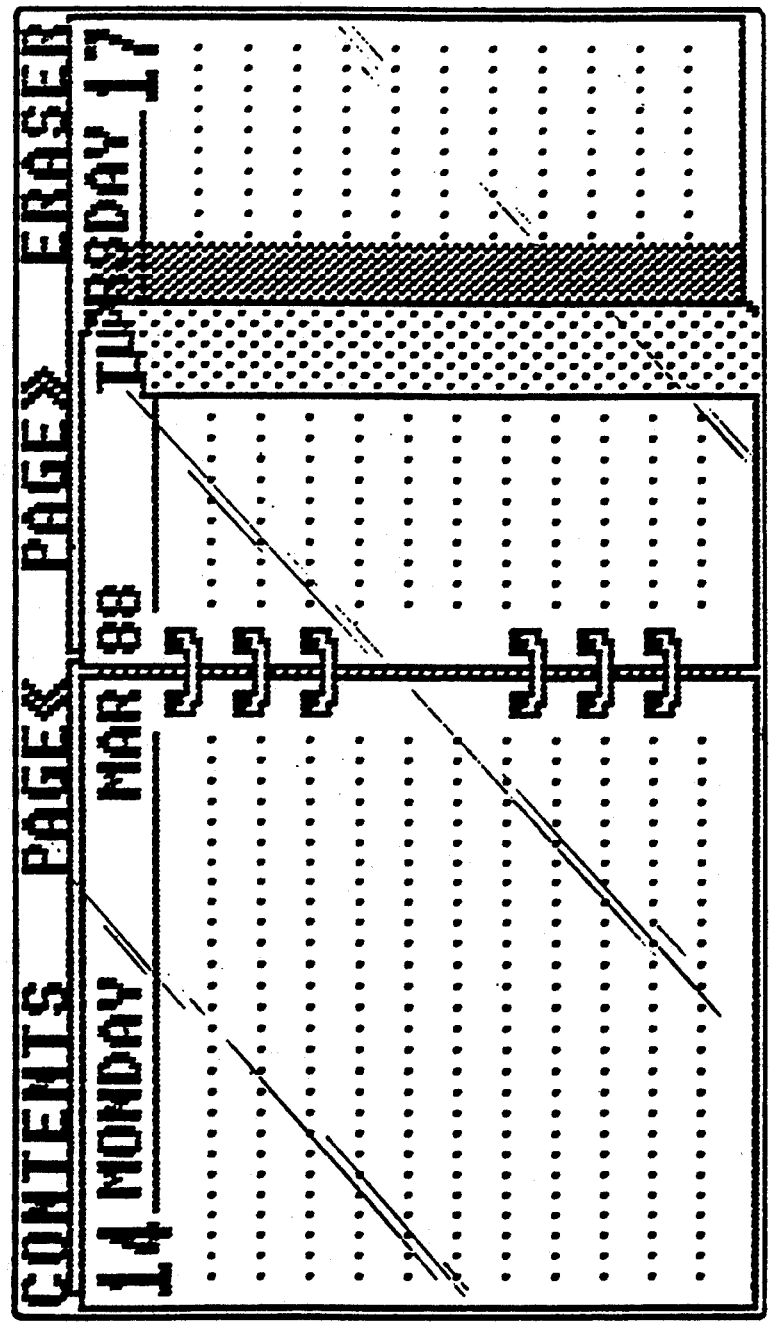

The user may then touch (step 23) the pad 3 using stylus 4 overlaying the region of screen 2 of interest. For instance, if the user touches (step 24) the region demarcated within the boundary to the word "instructions", i.e. the portion representing an instruction booklet, then a set of instructional notes (not shown) will be displayed (step 26) on the screen for a short while before reverting to the FIG. 3 depiction. Alternatively, should the user touch (step 25) the region of the pad overlaying an indexing tab, for instance the display of the tab marked "diary", then the telephone directory section will appear to be turned over (as illustrated in FIG. 3a), (step 27) and the diary mode will then be entered with the display of the appearance of a conventional personal organisor opened at its diary section (as illustrated in FIG. 4). Should the user not touch the tablet or pad within 5 seconds (step 29) of the initial depiction of the organisor opened to show its contents as shown in FIG. 3, then there may be displayed (step 28) the comment "Please either touch tab marking section required or touch instruction leaflet". If there is still no touch from the user after 40 seconds then the organisor automatically shuts off (step 22). Once in a section the display may be headed by four command words: "contents", "page<<", "page >>" and "eraser". Should the user touch a command word then the command is carried out (step 32), for instance touching the command word "contents" (step 29) (it will be understood that the user is in fact only touching the ITO pad 3 immediately overlaying the portion of the LCD screen displaying "contents") and the display will revert back to that displayed in FIG. 3. Should the user touch "page <<" then successive pages of the section will be displayed with the intervening pages appearing to be turned over, as illustrated by a diary in FIG. 4a. FIGS. 4b and 4c illustrate alternate layouts of the diary from that shown in FIG. 4a and 4b. Similarly, should the user touch an indexing tab (step 30) (for instance a particular address section within the address pages) then that section will be scrolled to and displayed (step 27). Valid touch points are therefore points overlaying indexing tabs, command words. Similarly, so are points which can reproduce the user input, i.e. points corresponding to paper in the representation. Should no valid touch point be pressed then after 5 seconds the comment (step 31) "Please write on the paper or touch a command, e.g. touch page >> and the pages will scroll forward" will appear.

Figure 5:
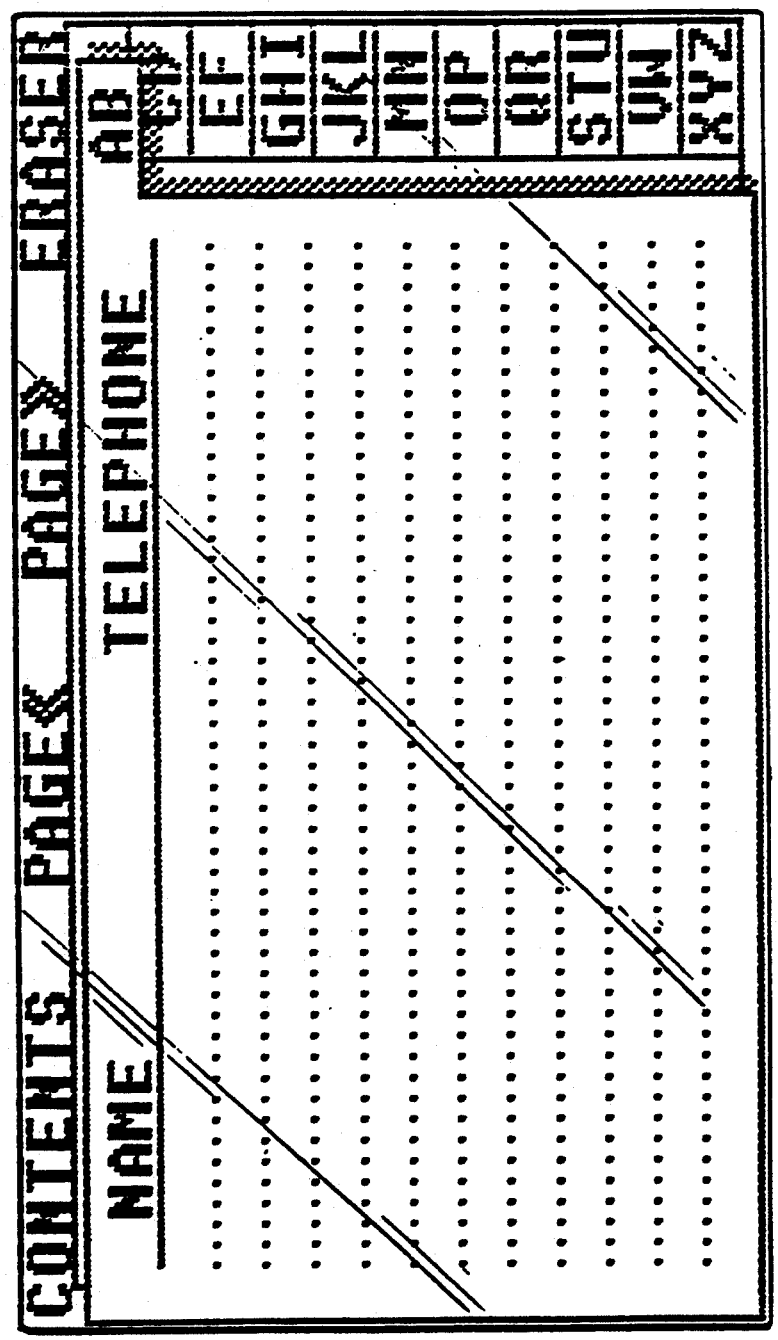
Figure 5A:
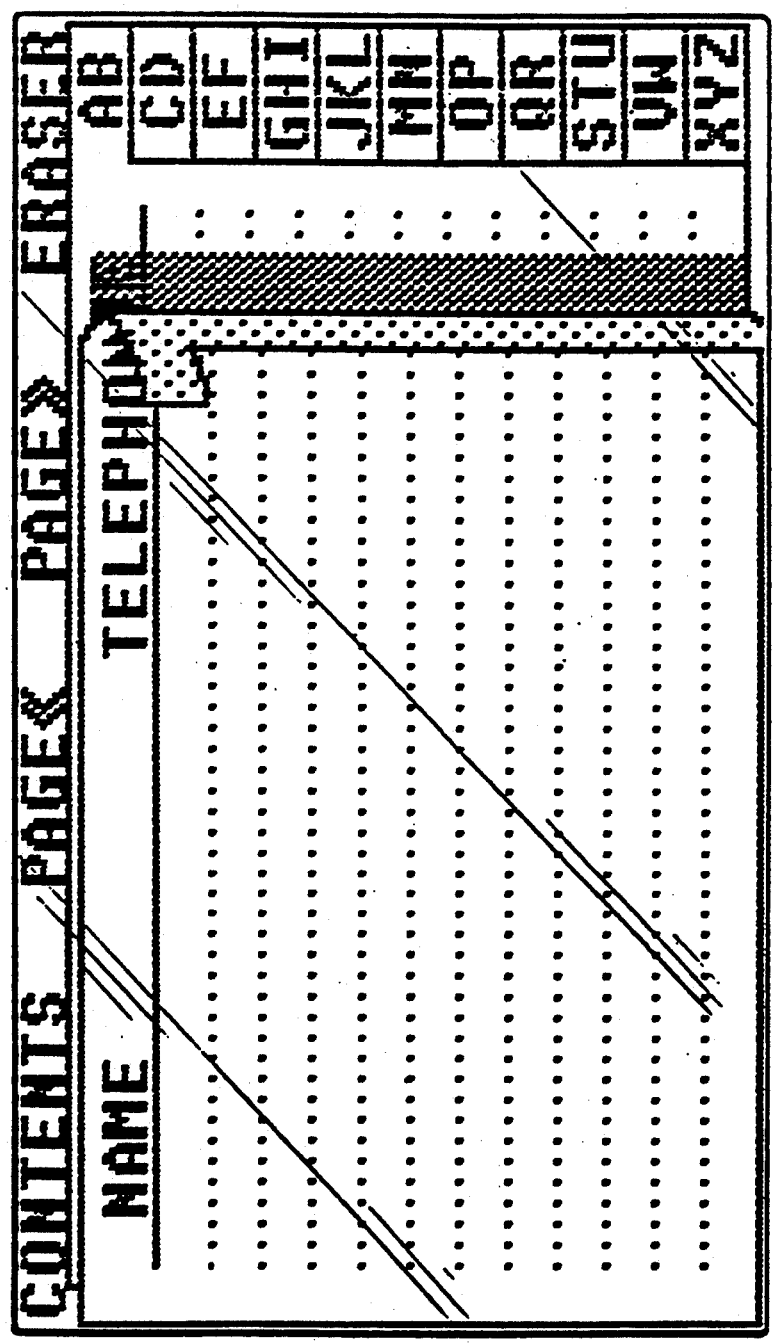

FIGS. 5 and 5a illustrate the display when the apparatus is in the address book mode.

Figure 6:
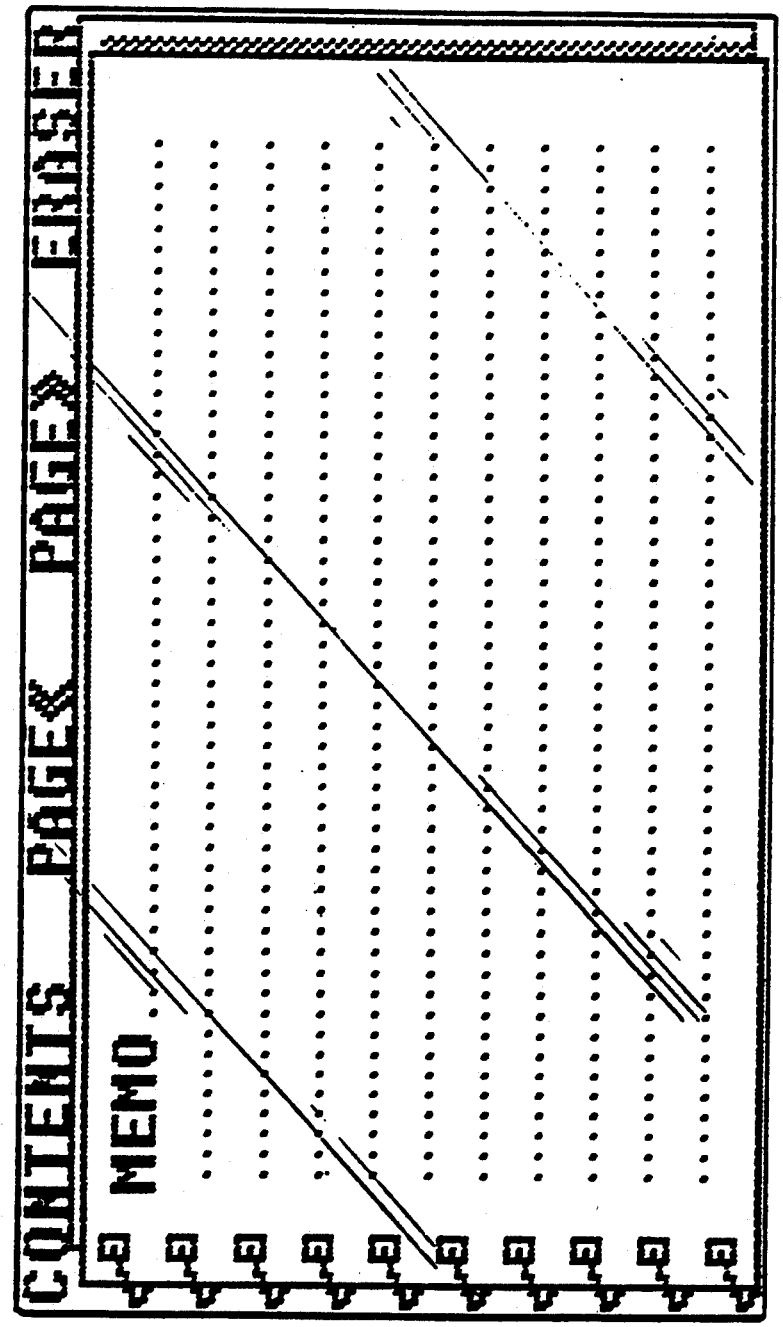
Figure 6A:
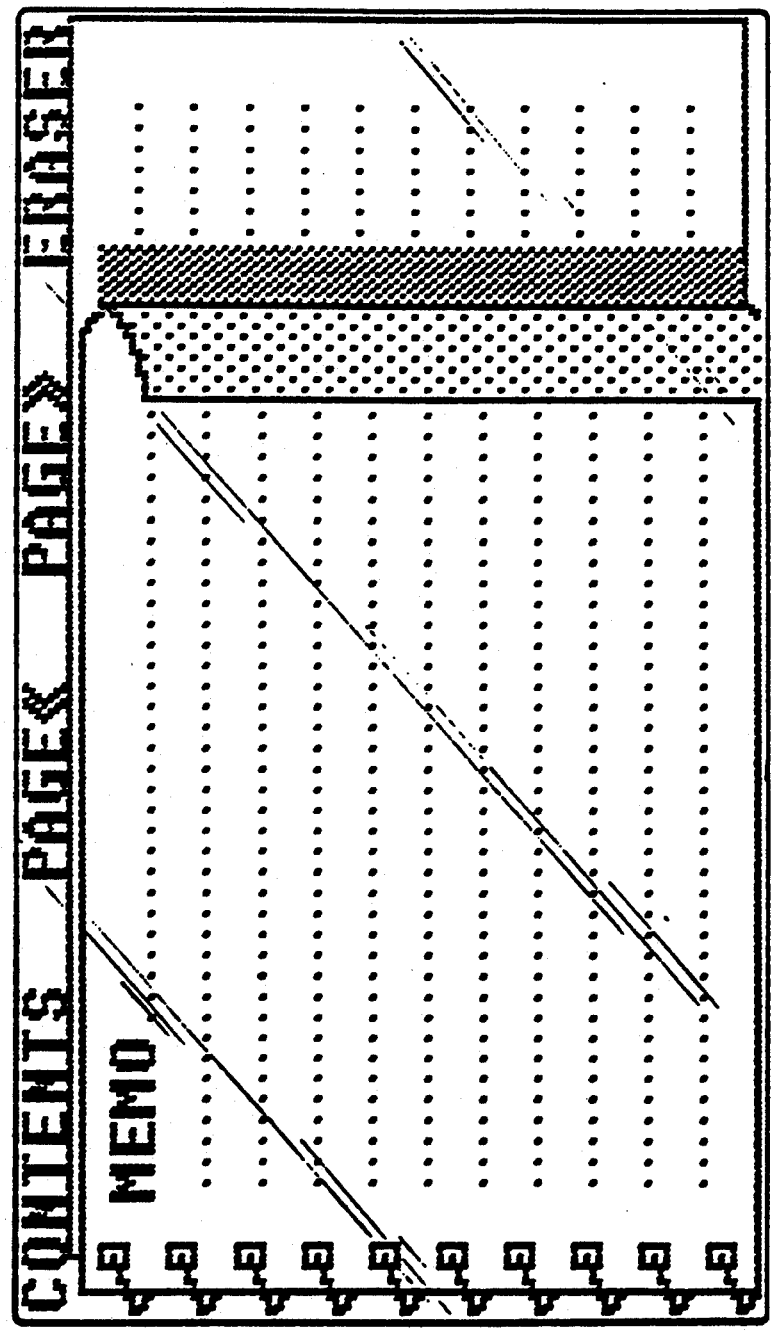

FIGS. 6 and 6a illustrate the display when the apparatus is in the memo pad mode.

To input information, the user simply uses the stylus 4 as if it were a pen and the ITO pad 3 a sheet of paper. The screen 2 will darken under areas of the pad 3 touched by the stylus 4 for regions which are valid touch points for reproducing graphical input. Graphical input (such as writing) will be converted to a digital locating signal via the A to D converter 11 (step 33) and then stored in the RAM 17 (step 34) and also displayed (step 35) on the display.

All previously entered input can be recalled together with the relevant representational graphics, which of course render the input locatable, by entering the appropriate mode and scrolling forwards or backwards through the pages as hereinbefore described. In addition there is provided an "ERASER" function. Should the user touch "ERASER" then any input to which the stylus is touched will disappear and be erased from storage.

I claim:

1. A method of processing an input from a stylus associated with a portable data processing apparatus having a display that displays graphics, said display further including a transducer pad in fixed relationship thereto, said method comprising the steps of:

displaying graphics that simulate pages bound into a portable notebook lying open to show at least substantially the whole of a first simulated page, said simulated page comprising at least one region to be written on to convey to a user of a conventional notebook sufficient information to enable the user to enter data into the simulated notebook;

positioning said stylus over a location in said region of said simulated page in proximity to said transducer pad and operating said stylus as if said stylus were a pen and said transducer pad were a sheet of paper;

converting the position of said stylus over said location in the simulated page into electrical signals indicative of the position;

storing the data responsive to said electrical signals as data in a memory, said data stored at locations in play proximate to the position of said stylus on said stylus on said transducer pad; and displaying perceivable graphics symbols on said display proximate to the position of said stylus o said transducer pad to represent the markings of a pen at said position.

2. The method as defined in claim 1, further comprising the step of generating signals to provide a display of representational graphics depicting a page or pages turning over on the display means.

3. The method as defined in claim 1, wherein the representational graphics depict simulated pages arranged into various sections separated by page dividers with tabs, said method further comprising the step of generating tab selection signals defining the position of the stylus with respect to said tabs to allow selection of a required operational mode of the organizer in dependence on the tab selected.

4. The method as defined in claim 3, further comprising the steps of:

selecting a required operational mode or a page within an operational mode;

generating signals to display representational graphics depicting at least one page turning over after said step of selecting a required operational mode or a page within an operational mode; and displaying representational graphics associated with the selected operational mode or page.

5. The method as defined in claim 3, wherein an operational mode is an application program.

6. The method as defined in claim 5, further comprising the steps of:

selecting a required application program;

generating signals to provide representational graphics depicting a page or pages turning over; and displaying representational graphics associated with the selected application program.

7. The method as defined in claim 1, wherein said transducer pad comprises a membrane transducer pad operable to provide an electrical signal indicative of the position of the pad at which pressure is applied by said stylus, said applied pressure being in excess of a predetermined threshold of pressure.

8. The method as defined in claim 1, further comprising the steps of:

reading a programmable read-only memory device; and generating predetermined representational graphics responsive to information held in said programmable read-only memory device.

9. The method as defined in claim 1, further comprising the steps of transferring all stored information to an external storage device.

10. The method of processing as defined in claim 1, wherein said perceivable graphics symbols on said display comprise alphanumeric characters representing handwriting or hand printing responsive to movement of said stylus, said handwriting or hand printing appearing on said display with a size the same size as said movements of said stylus, said handwriting or hand printing displayed on said simulated page without adjustment of said size.

11. A method of processing handwritten graphical information from a stylus in an electronic personal organizer, said organizer being adapted to display representational graphics simulating pages bound into a portable notebook lying open to show at least substantially the whole of a first simulated loose-leaf page of a number of loose-leaf pages arranged into various sections separated by page dividers with tabs, said method comprising the steps of:

generating a menu on a display screen, said menu incorporating available sections of said notebook together with printed information associated with different pages of said available sections, said menu and said simulated pages together conveying to a user of a conventional notebook sufficient information to use said electronic personal organizer;

positioning a stylus proximate to a location in the first simulated loose-leaf page to cause the reception by said personal organizer of information representing the position and movement of said stylus as it is moved to generate handwritten graphical information;

displaying said handwritten graphical information on said display screen at said location in the simulated page substantially simultaneously with the reception of said handwritten graphical information, said handwritten graphical information displayed on said display screen the same size as the movements of said stylus; and storing data representing said handwritten graphical information in a memory for subsequent recall in association with said page, said handwritten graphical information displayed upon recall at the same size at which it was entered using said stylus.

12. The method as defined in claim 11, further comprising the steps of:

positioning said stylus over a simulated tab to provide a tab selection signal; and selecting a required operational mode of the organizer in response to said tab selection signal.

13. A method of processing input from a stylus in a data processing apparatus adapted to display representational graphics that simulate loose-leaf pages bound into a portable notebook lying open to show at least substantially the whole of a first simulated page, said simulated loose-leaf pages arranged into various sections separated by page dividers with tabs, said method comprising the steps of:

generating signals to display said representational graphics on a display device to convey to a user of a conventional notebook sufficient information to enable the user to enter data into the simulated notebook;

positioning said stylus over a simulated tab displayed on said display device and proximate to a transducer pad associated with said display device;

converting the position of said stylus with respect to said transducer pad into electrical tab selection signals indicated of said position; and selecting a required operational mode of the apparatus in response to said electrical tab selection signals in accordance with the tab selected by said position of said stylus.

14. The method as defined in claim 13, wherein said required operational mode is an application program.

15. The method as defined in claim 14, wherein said application program provides a diary or address function.

16. An electronic data processing apparatus arranged to process input from a stylus, the apparatus being adapted to be portable and further adapted to display representational graphics simulating pages bound into a portable notebook lying open to show at least substantially the whole of a first simulated page and arranged into various sections separated by page dividers with tabs, said apparatus comprising:

means for generating signals to provide the representational graphics, with at least one simulated page comprising at least one region provided to be written on, said simulated page conveying sufficient information to a user of a conventional notebook to enable the user to operate said data processing apparatus in the same manner as a conventional notebook;

display means for displaying said graphics;

input means comprising a transducer pad and said stylus, said stylus being manually operable to be positioned over a location in the region of the simulated page to thereby cooperate with the transducer pad to provide an input to be displayed at that location as if the stylus were a pen and the transducer pad were a sheet of paper;

means for converting the position of the stylus over said location into electrical signals indicative of the position of the stylus with respect to the transducer pad;

means for controlling the display means, said controlling means comprising means for utilizing said electrical signals to display the input from the stylus at said location, said input information displayed on said display screen the same size as the movements of said stylus; and means for storing the graphical input as data at positions in a memory associated with the location in the simulated page.

17. The apparatus as defined in claim 16, wherein;

said representational graphics includes a simulated tab;

said stylus produces a tab selection signal when positioned over said simulated tab; and said means for utilizing the electrical signals selects a required operational mode of the apparatus in response to said tab selection signal.

18. The apparatus as defined in claim 17, wherein said means for generating signals responds to the selection of a required operational mode or the selection of a page within a mode and provides representational graphics depicting at least one page turning over prior to displaying representational graphics associated with the selected mode or page.

19. The apparatus as defined in claim 16, wherein said transducer pad comprises a membrane transducer pad operable to provide an electrical signal indicative of the position of the pad at which pressure is applied by said stylus, said applied pressure being in excess of a predetermined threshold of pressure.

20. The apparatus as defined in claim 16, further comprising a programmable read-only memory device, said means for generating predetermined representational graphics being adapted to generate graphics in response to information stored in said programmable read-only memory device.

21. The apparatus as defined in claim 16, further comprising means for transferring stored information to an external storage device.

22. An electronic personal organizer arranged for processing input from a stylus, the organizer being adapted to display representational graphics simulating pages bound into a portable notebook lying open to show at least substantially the whole of a first simulated page and arranged into various sections separated by page dividers with tabs, said organizer comprising:
- a display screen;
- a stylus movable in proximity to said display screen;
- means for generating a menu on said display screen, said menu incorporating available sections of said portable notebook together with printed information associated with different simulated pages of said available sections, said menu and said simulated pages together providing sufficient information to a user of a conventional notebook to enable the user to operate said electronic personal organizer in the same manner as a conventional notebook;
- means for generating positional information when said stylus is moved in proximity to a location in a simulated page displayed on said display screen thereby inputting graphical information to be displayed at said location;
- means for displaying said graphical information on the display screen at said location in said page substantially simultaneously with the generation of the information, said graphical information displayed at substantially the same size as said information is entered by said stylus; and
- means for storing said graphical information in a memory means for subsequent recall in association with said page.

23. The electronic personal organizer as defined in claim 22, further comprising:
- a simulated tab displayed on said display screen, said stylus providing a tab selection signal corresponding to positional information when said stylus is positioned proximate to said simulated tab to select said tab; and
- means for utilizing said positional information to select a required operational mode of the organizer in response to the selection of said tab.

24. A data processing apparatus for processing input from a stylus, the apparatus being adapted to display representational graphics simulating pages bound into a portable notebook lying open to show at least substantially the whole of a first simulated page and arranged into various sections separated by page dividers with tabs, said apparatus comprising:
- means for generating signals to provide said representational graphics, said representational graphics conveying sufficient information to a user of a conventional notebook to enable the user to operate said data processing apparatus in the same manner as a conventional notebook;
- means for displaying said representational graphics;
- a transducer;
- a stylus that interacts with said transducer to generate positional signals corresponding to locations on said simulated page, said page dividers and said tabs;
- means for converting the position of said stylus over one of said tabs into electrical tab selection signals indicative of the position of the stylus with respect to the transducer pad; and
- means for utilizing said electrical signals to select a required operational mode in response to the selected tab.

25. The apparatus as defined in claim 24, wherein at least one operational mode comprises an application program.

26. The apparatus as defined in claim 25, wherein said application program provides a diary or address function.

* * * * *